Nov. 5, 1957     D. E. KOTAS     2,811,855
ELECTRICAL FLUID FLOW MEASURING APPARATUS
Filed Sept. 30, 1954     2 Sheets-Sheet 1
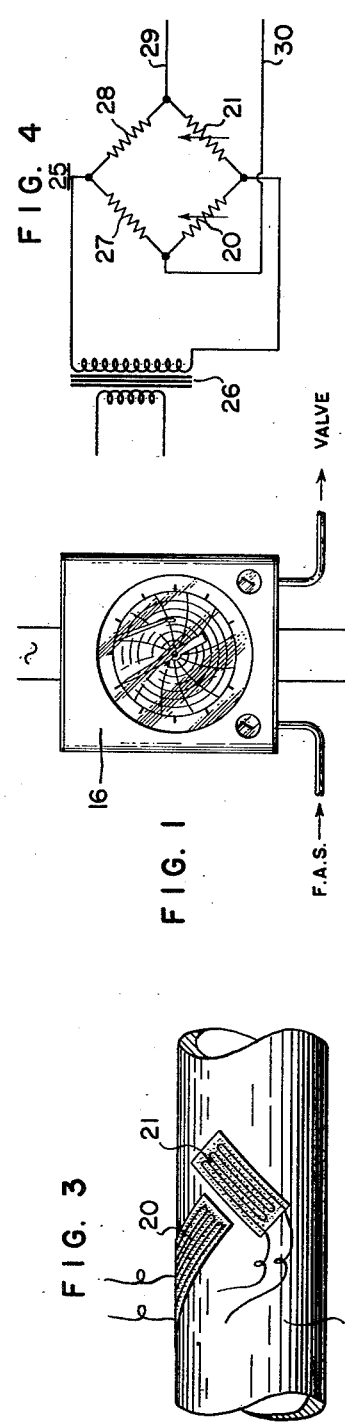
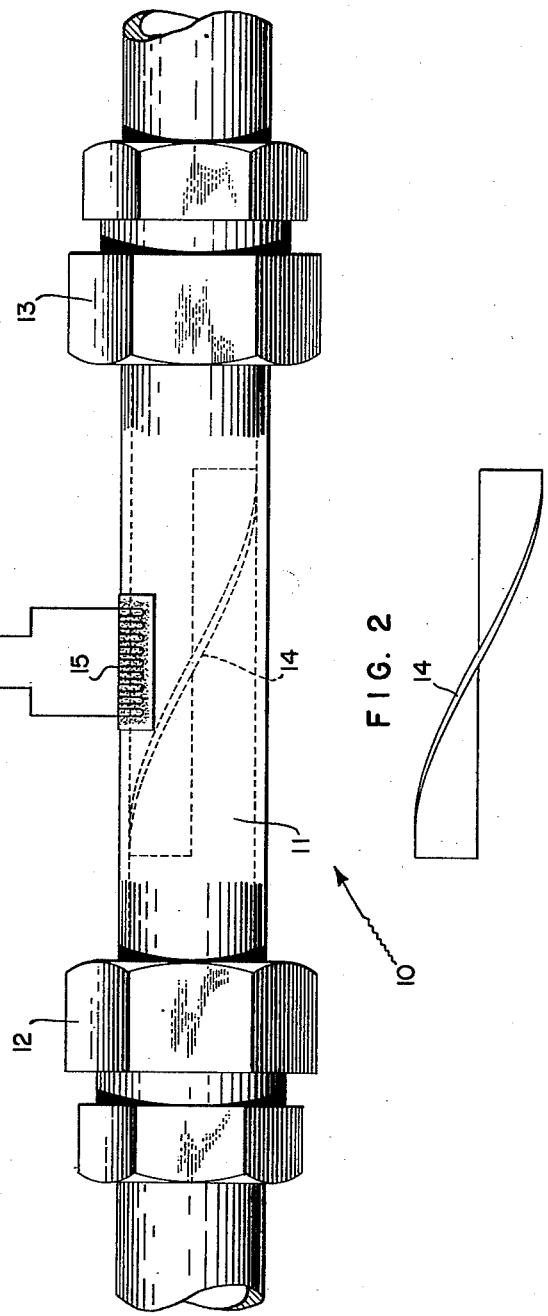
*INVENTOR.*
DONALD E. KOTAS
BY
ATTORNEY.

Nov. 5, 1957

D. E. KOTAS 2,811,855

ELECTRICAL FLUID FLOW MEASURING APPARATUS

Filed Sept. 30, 1954

INVENTOR.
DONALD E. KOTAS

BY
Arthur H. Swanson
ATTORNEY.

United States Patent Office 2,811,855
Patented Nov. 5, 1957

2,811,855

ELECTRICAL FLUID FLOW MEASURING APPARATUS

Donald E. Kotas, Philadelphia, Pa., assignor to Minneapolis-Honeywell Regulator Company, Minneapolis, Minn., a corporation of Delaware Application September 30, 1954, Serial No. 459,329

8 Claims. (Cl. 73—228)

A general object of the present invention is to provide a new and improved fluid flow measuring apparatus. More specifically, the invention is concerned with an electrical type of fluid flow measuring apparatus which is characterized by its simplicity and wide applicability in the field of fluid flow measurement.

In the prior art, numerous arrangements have been proposed for sensing the motion of fluid flowing in a flow line and for transmitting the flow signal to a utilization device. The use of these prior arrangements has presented many practical problems typical among which are those involving leaky fluid seals and the contamination of the flow sensing elements positioned directly within the fluid flow line.

The present invention overcomes the difficulties of the prior art devices by providing a flexible tube which is adapted to be stressed by means attached thereto with this means being positioned in the fluid flow path. The stressing of the wall of the tube is arranged to be detected by any suitable strain sensing element which may be used in conjunction with conventional types of electrical or mechanical measuring instruments with these instruments being calibrated directly in terms of rate of fluid flow.

It is therefore a more specific object of the present invention to provide an improved flow measuring apparatus which comprises a flexible tube with the walls of the flexible tube being arranged to be stressed by means positioned in the path of the fluid the flow of which is to be measured.

Another more specific object of the present invention is to provide a flow measuring apparatus employing a flexible tube having a wall stressing member mounted on the wall thereof and adapted to be subjected to the flow of the fluid in a flow line.

Still another object of the present invention is to provide an improved fluid flow measuring apparatus in the form of a hollow flexible tube which is adapted to have a torsional stress applied thereto by means positioned within the tube and wherein means are attached to the outer wall of the tube for measuring the torsional stress applied thereto.

A further object of the present invention is to provide an improved flow measuring apparatus incorporating a hollow flexible tube which is adapted to have the wall thereof flexed in accordance with the rate of fluid flowing therethrough wherein this wall flexure is detected by a strain sensing means connected to a suitable indicating and/or controlling instrument.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Of the drawings:

Fig. 1 shows the complete apparatus;

Fig. 2 shows a detail of a part of the apparatus of Fig. 1;

Fig. 3 shows a pair of strain units mounted on the pipe used in the apparatus;

Fig. 4 shows a representative type of bridge circuit which incorporates the strain units of Fig. 3.

Figure 5:
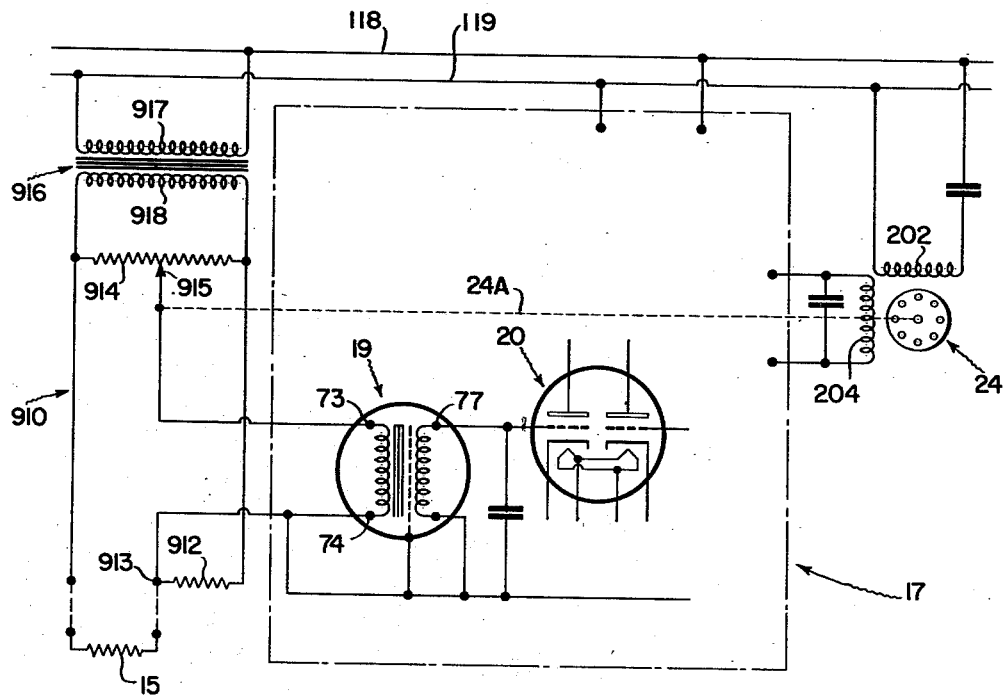
Fig. 5 is a mechanical and electrical diagram showing the parts constituting the indicating and control instrument 16 and the circuit connections between them.

Referring to Fig. 1, the numeral 10 indicates generally a fluid flow line which may be transmitting any suitable fluid such as a gas or a liquid between two points. Coupled into this line is a hollow flexible tube 11 which may be formed of plastic or other suitably resilient type of material. The tube 11 is fastened into the line 10 by couplings 12 and 13 on either end thereof. Fastened to the inner wall of the tube 11 is a wall deflecting element 14. As shown in Fig. 2, the form is that of a helix and may well be made by twisting a rectangular member to the desired shape. While the helix has been shown as the wall deflecting member, it will be readily apparent that this member may take numerous forms and shapes so long as the member is capable of deflecting or stressing the wall of the tube 11.

In order to detect the deflection and stressing of the wall of the tube 11, there is provided a resistive type of strain element 15 which is bonded to the outer surface of the wall. While a resistance type of element has been shown, it will also be apparent that other forms of strain sensing elements may be attached to the wall. The strain sensing element 15 may be connected to a suitable potentiometric type of measuring instrument. This measuring instrument may well be of the type which provides an indication as well as an output control signal which may be used for regulating a valve in series in the flow line 10. The indicating and control instrument 16 may well be of the type disclosed in the patent to Walter P. Wills, No. 2,423,540, issued July 8, 1947.

Referring now to Fig. 5, there is schematically illustrated the parts constituting the indicating and control instrument 16 and the means by which these parts are connected in circuit with one another. Instrument 16 comprises a self-balancing potentiometer-controller employing an A. C. bridge. An amplifier, generally indicated 17, has a transformer 19 and an amplifying vacuum tube 20. The output of amplifier 17 operates a reversible, electric motor 24 having power winding 202 and control winding 204. Motor 24 has a mechanical connection marked 24A which operates a sliding, electric contact 915. Motor 24 also causes instrument 16 to put out an output control signal (which may be either electric or pneumatic) which may be used for regulating a valve in series in the flow line 10.

The A. C. bridge as a whole is designated 910. A strain element 15 of the resistive type may be located remotely from amplifier 17 and is responsive to the deflection and stressing of the wall of tube 11. The A. C. bridge 910 also includes a resistance 912, the resistances 15 and 912 being connected together at point 913. The A. C. bridge 910 also includes a resistance 914 engaged by the slidable contact 915 which in turn is moved by the reversible motor 24 by a mechanical connection indicated 24A. The contact 915 in effect divides the resistance 914 into two resistances. An A. C. potential is supplied to the A. C. bridge 910 by a transformer 916 having a primary 917 connected across the power lines 118 and 119 and having a secondary 918 connected to the A. C. bridge 910. The contact 915 is connected to the terminal 73 of transformer 19 and the point 913 is connected to the terminal 74 of the transformer 19. The transformer 916 is arranged so that during the first half cycle of the alternating voltage supply the right end of the transformer secondary 918 is positive and during the second half cycle the left end is positive.

Assume that the flow of fluid through the fluid flow line 10 causes the hollow flexible tube 11 to deflect in such a way as to increase the resistance of the resistance 15. During the first half cycle the potential of the point 913 is greater than the potential of the contact 915. A current is, therefore, caused to flow from terminal 74 to terminal 73 in the transformer 19. This causes the potential of the terminal 73 of the transformer to become positive during the first half cycle. During the second half cycle the potential of the point 913 is less than the potential of the contact 915 to cause a current flow from the terminal 73 to the terminal 74 of the transformer 19. This, in turn, causes the potential of the terminal 73 to become negative during the second half cycle. Accordingly, upon an increase in the resistance of the strain sensing element 15, the potential of the terminal 77 of the transformer 19 is caused to alternate in phase with the supply voltage which causes the motor 24 to operate in a direction to move the contact 915 to the right. When the contact 915 is moved sufficiently far to the right to cause the potential thereof to be the same as the potential of the point 913 then the A. C. bridge is balanced and the reversible motor 24 is stopped.

Contrarywise, assume that the resistance of the strain sensing element 15 decreases. During the first half cycle the potential of the point 913 becomes less than the potential of the contact 915. During the second half cycle the potential of the point 913 becomes greater than the potential of the contact 915. This causes the potential of the terminal 77 of the transformer 19 to alternate 180° out of phase with the supply voltage. This causes the reversible motor 24 to operate in the opposite direction to move the contact 915 to the left. When the contact 915 moves sufficiently far to the left to cause the potential thereof to equal the potential of the point 913, then the A. C. bridge is balanced and the reversible motor 24 is stopped.

In considering the operation of the present apparatus, it will be readily apparent that as fluid flows through the pipe 10 and the tube 11, the fluid will impinge upon the helical element 14. As the fluid strikes the element 14, it will be deflected and there will be resultant torsional stressing of the wall of the tube 11. This stressing will be proportioned to the rate of fluid flow. Consequently, by placing the strain element 15 upon the wall of the tube 11, it is possible to measure directly the force of the fluid striking the helical element 14. The resistance change of the strain element 15 will be detected by the instrument 16 which instrument may be suitably calibrated in terms of fluid flow. In addition, the instrument 16 may produce an output control pressure which may be used to regulate a flow control valve in the line 10.

It will be readily apparent in the present apparatus that the measured fluid is completely isolated from the strain sensing element 15 and there is no problem of a fluid seal or other means for transmitting a flow signal through the pipe to the sensing element 15. Further, the helical element 14 may be formed to be substantially free from any contamination problems.

In Fig. 3, the apparatus is modified so that the effects of any longitudinal stress on the pipe 11 may be eliminated. This is accomplished by placing a pair of strain resistance units 20 and 21 on the pipe 11 so that the longitudinal axis of both of the units are 45° with respect to the longitudinal axis of the pipe 11. Further, the units are positioned 90° wth respect to each other.

A longitudinal stress on the pipe 11 will cause the resistance of the units 20 and 21 to change equally and in the same direction. Thus, the affect of longitudinal stress may be cancelled out.

Fig. 4 shows a representative bridge 25 which incorporates the units 20 and 21. Supplying power to the bridge is a transformer 26. Also included in the bridge are a pair of fixed resistors 27 and 28. The output terminals are at 29 and 30.

In Fig. 4, if the resistances of units 20 and 21 change equally and in the same direction, the bridge will not become unbalanced and there will be no output. However, when the pipe 11, in Fig. 3, is torsionally stressed, the resistances of the units 20 and 21 will change in magnitude and in opposite directions. Thus, the bridge of Fig. 4 will be unbalanced and there will be an output on leads 29 and 30.

While, in accordance with the provisions of the statutes, there has been illustrated and described the best forms of the invention known, it will be apparent to those skilled in the art that changes may be made in the form of the apparatus disclosed without departing from the spirit of the invention as set forth in the appended claims, and that in certain cases, certain features of the invention may be used to advantage without a corresponding use of other features.

Having now described the invention, what it is desired to secure by Letters Patent is:

1. Flow sensing apparatus comprising a hollow flexible tube through which a fluid may flow and adapted for rigid mounting at its ends, means positioned within said tube to produce a torsional force on said tube between the ends thereof in accordance with the rate of flow of fluid therethrough, and means mounted on said tube to sense the magnitude of the torsional force applied to said tube and thereby provide a response proportional to the rate of fluid flow through said tube.

2. Fluid flow measuring apparatus comprising a hollow torsionally deflectable tube, fluid flow deflecting means mounted within said tube to apply a torsional force to said tube in accordance with the rate of fluid flow through said tube, and stress responsive means mounted on said tube to respond to the deformation thereof.

3. Fluid flow measuring apparatus comprising a hollow fluid flow tube having flexible wall, means extending into said tube and fastened to said wall, said last named means applying a stress to said wall to torsionally flex said wall in accordance with the rate of fluid flowing through said tube, and wall flexure sensing means connected to said tube to respond to the rate of fluid flowing therethrough.

4. Fluid flow measuring means comprising a straight section of hollow flexible tubing, a helical element mounted on the wall of said tubing and extending into the region where fluid is adapted to flow, said helical element applying a torsional force to said tubing in accordance with the rate of fluid flow, and stress sensing means mounted on the wall of said tube on the side of the tubing opposite said helical element.

5. Apparatus as defined in claim 4 wherein said stress sensing means comprises an electrical strain gauge element bonded to the wall of said tubing.

6. Apparatus as defined in claim 4 wherein said stress sensing means comprises a pair of resistance strain units positioned on the wall of said tubing so that a longitudinal stressing of said tubing will give no apparent indication of a fluid flow change.

7. Apparatus as defined in claim 4 wherein said stress sensing means comprises an electrical resistance strain gauge bonded to the wall of said tubing.

8. Apparatus as defined in claim 7 wherein said strain gauge is connected to a potentiometric measuring means calibrated in terms of fluid flow.

(References on following page)

References Cited in the file of this patent

UNITED STATES PATENTS

| | | |
|---|---|---|
| 1,451,272 | Robinson | Apr. 10, 1923 |
| 1,859,071 | Burger | May 17, 1932 |
| 2,403,951 | Ruge | July 16, 1946 |
| 2,420,148 | Ostergren | May 6, 1947 |
| 2,538,785 | Karig | Jan. 23, 1951 |
| 2,672,889 | Swanson | Mar. 23, 1954 |
| 2,740,858 | Euler | Apr. 3, 1956 |